(No Model.)　　P. D. DAFFIN & H. B. DRESSER.　2 Sheets—Sheet 2.

COTTON CLEANER.

No. 263,121.　　　　　　　Patented Aug. 22, 1882.

Witnesses.
A. Ruppert,
W. C. Chaffee

P. D. Daffin
H. B. Dresser
Inventor.
Holloway & Blanchard
Attys

UNITED STATES PATENT OFFICE.

PHILIP D. DAFFIN AND HENRY B. DRESSER, OF SAVANNAH, GEORGIA.

COTTON-CLEANER.

SPECIFICATION forming part of Letters Patent No. 263,121, dated August 22, 1882.

Application filed May 17, 1882. (No model.)

*To all whom it may concern:*

Be it known that we, PHILIP D. DAFFIN and HENRY B. DRESSER, citizens of the United States, residing at Savannah, in the county of Chatham and State of Georgia, have invented certain new and useful Improvements in Cotton-Cleaners, of which the following is a specification, reference being had therein to the accompanying drawings.

Our invention relates to machines for removing from cotton fiber, cotton waste, and other fibrous substances sand and other forms of solid substances; and the object of our improvements is to provide a machine for such purposes consisting of an outer revolving frustum of a cone covered with some foraminous substance, and an interior revolving shaft or cylinder carrying beaters for whipping the material and forcing it outward against pins placed in bars attached to the outer revolving frustum of a cone, its rates of speed or the number of revolutions made by it in a given period of time being considerably fewer than the number imparted to the interior shaft or cylinder. We attain this object by the mechanism illustrated in the accompanying drawings, in which—

Figure 1:
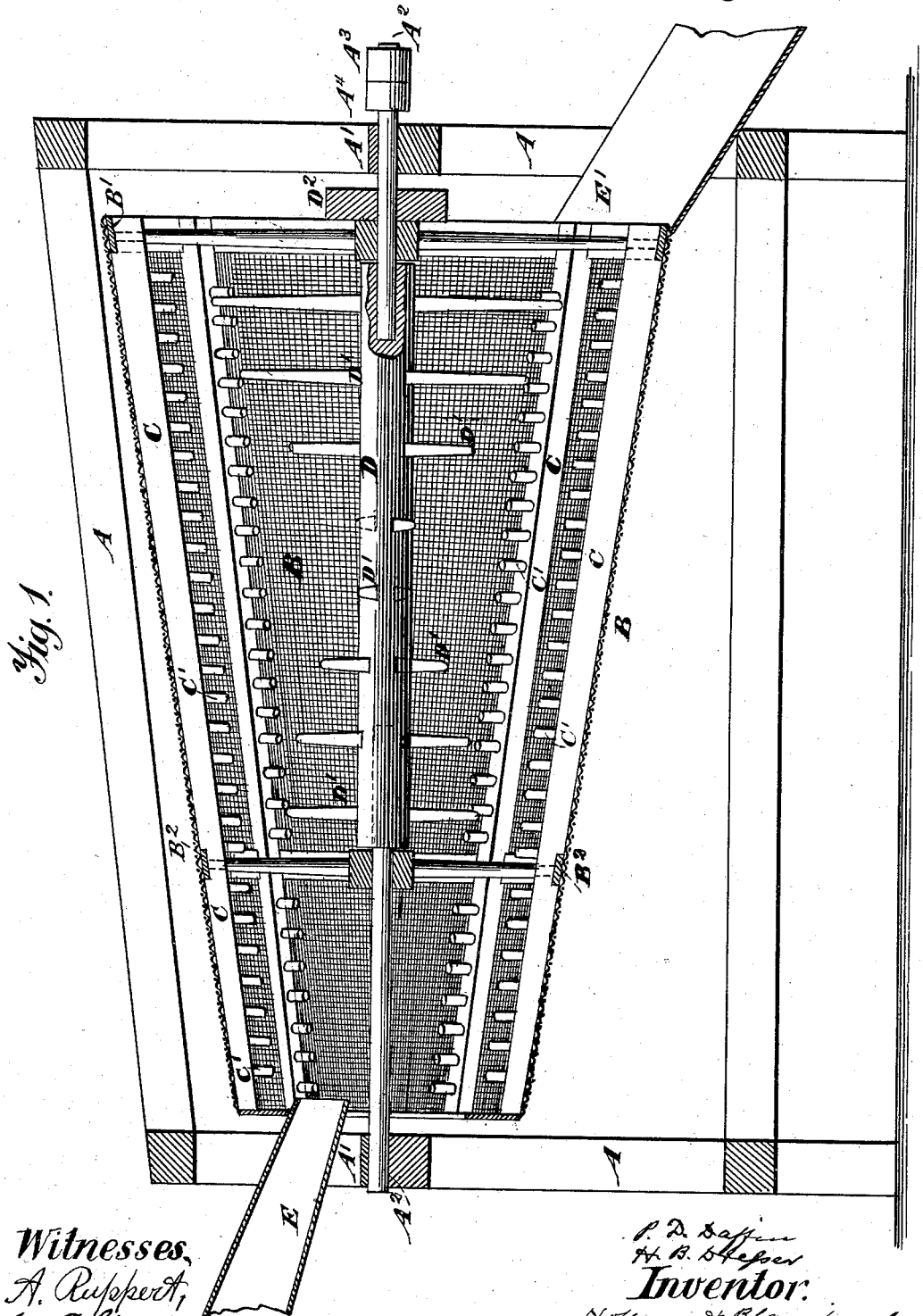
Figure 2:
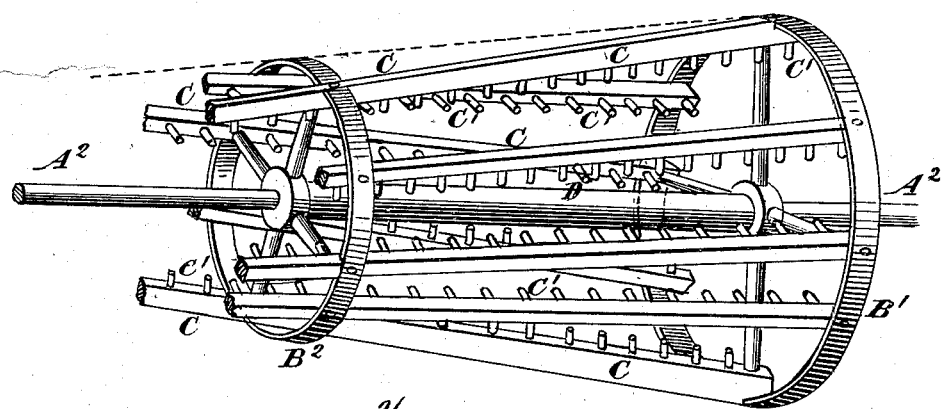

Figure 1 is an elevation partly in section, showing the frame-work of our improved machine, the conical outer frustum, a shaft carrying the beaters, pulleys for driving the frustum and cylinder, and spouts for introducing and discharging the material to be treated. Fig. 2 is a perspective view of the external frustum with the covering removed, showing the rings at its ends and the diagonally-arranged bars to which the covering is attached; and Fig. 3 is an end view, showing the external frustum and internal shaft or cylinder and the arrangement of the beaters.

Similar letters refer to similar parts throughout the several views.

In constructing machines of this character we provide a suitable frame, A, constructed by preference as shown in Fig. 1, but which may be of any other suitable form, and which may be of wood or metal. This frame is provided with bearings $A'$ $A'$ for the shaft $A^2$, which carries and gives motion to the external frustum, B, it having upon one of its ends, which projects beyond the frame-work, a loose and a tight pulley, $A^3$ and $A^4$, the latter being fast upon the shaft $A^2$ and the former turning freely thereon. Over these pulleys a belt from any prime mover passes and gives the required movement to the shaft and to the frustum carried thereon. The external frustum above alluded to consists of rings of metal, $B'$ $B^2$, or of spiders provided with arms and hubs for attaching them to the shaft $A^2$ by means of set-screws or of keys, and of bars of wood, C C, of which there may be any desired number, they being firmly secured to the interior surface of the rings or spiders $B'$ $B^2$ in such manner that their outer surfaces shall be flush with the outer surface of said rings, they being oblique to the axis of the shaft of the frustum for the purpose of aiding the passage of the material through the machine. From the inner surfaces of these bars a series of pins, $C'$, project inward, as shown, they being so arranged that the beaters formed upon the interior shaft or cylinder, when the two are revolved, come nearly in contact therewith, and thus whip out or remove from the material any sand or other solid foreign substances; and in order that the substances thus removed may be properly discharged from the machine the remaining component part of the exterior cylinder consists of a covering of wire-gauze or other foraminous substance, through which the sand and other foreign substances may pass and fall upon the floor or into any receptacle provided for it.

Figure 3:
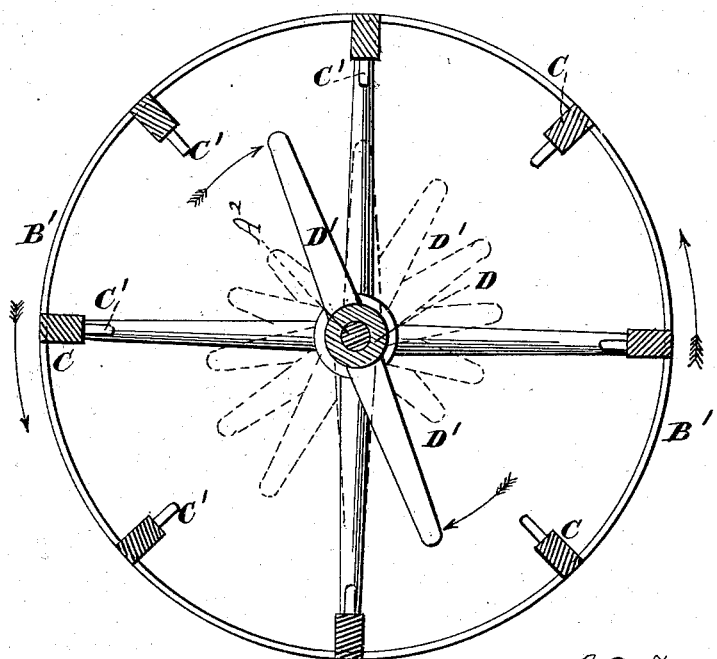

Within the external frustum there is placed a cylinder or shaft, D, which is provided with a series of beaters, $D'$, which are arranged spirally around said shaft or cylinder as shown in Fig. 3, which arrangement facilitates the passage of the material through the machine, it being fed thereto through a spout or hopper, E, and discharged at $E'$. The cylinder or shaft D does not extend the entire length of the frustum, but stops some distance from its smaller end, as shown in Fig. 1, it being caused to revolve freely upon the shaft $A^2$ and driven by a pulley, $D^2$, which is firmly secured to said shaft by a key, or in any other suitable manner, inside of the frame A.

It will be observed that the driving-pulleys $A^4$ and $D^2$ are of different sizes, the object being to make provision for driving the external frustum and internal cylinder from a drum or pulley of even size throughout at different rates of speed, the object being to cause the center shaft, and consequently the exterior frustum, to rotate, say, one hundred and fifty revolutions while the other one rotates from forty to sixty, the two revolving in opposite directions, the effect of which is to give to the material an additional amount of beating in a cylinder of given length.

Having thus described our invention, what we claim, and desire to secure by Letters Patent, is—

In a machine for removing sand and other foreign matter from cotton and other fibrous substances, the combination of the exterior frustum, B, covered with wire-gauze or other foraminous substance, and provided with obliquely-arranged bars which have in them series of projecting pins, and an internally-revolving shaft or cylinder which rotates in an opposite direction to that of the frustum, it being provided with spirally-arranged projecting pins or arms, substantially as and for the purpose set forth.

In testimony whereof we affix our signatures in presence of two witnesses.

PHILIP D. DAFFIN.
H. B. DRESSER.

Witnesses:
SAML. I. WHITESIDE,
F. E. PARKER.